United States Patent Office 3,370,402
Patented Feb. 27, 1968

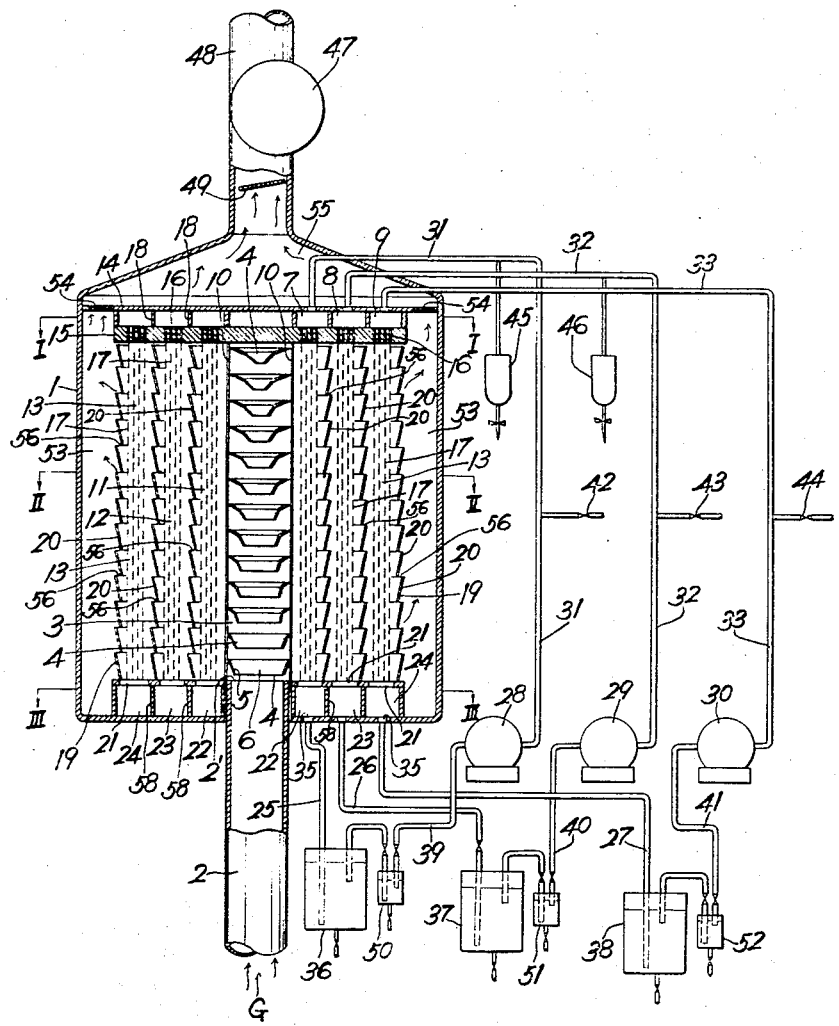

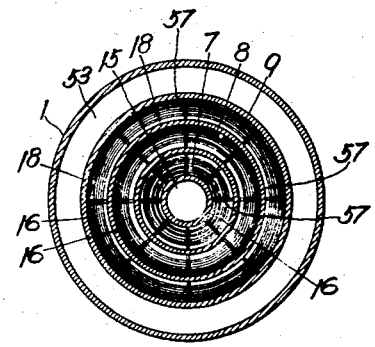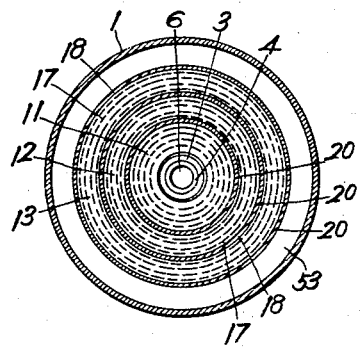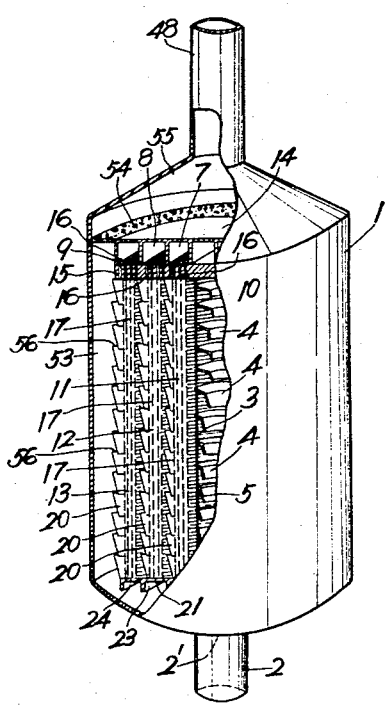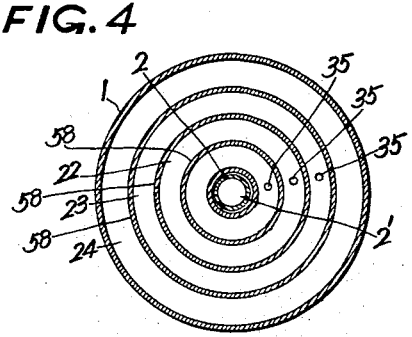

3,370,402
METHOD AND APPARATUS FOR CLEANING CONTAMINATED GAS
Yoshiyuki Nakai and Tetsuya Yokogawa, Yokohama, Japan, assignors to Kanagawa Prefecture, Yokohama, Japan, a corporation of Japan
Filed May 6, 1966, Ser. No. 548,230
Claims priority, application Japan, July 8, 1965, 40/40,992
12 Claims. (Cl. 55—94)

ABSTRACT OF THE DISCLOSURE

A method and apparatus for cleaning contaminated gas in which the contaminated gas is fed in transverse direction through a plurality of preferably cylindrical and coaxially arranged screens on which liquid films are formed so that the contaminations contained in the gas are removed by the liquid forming the films, and in which the cleaned gas and the liquid containing the contaminations are then fed away from each other in opposite directions.

---

The present invention relates to a method and apparatus for cleaning and making harmless contaminated gases such as the noxious gases generated in factories and sanitation facilities, incomplete combustion gases, organic waste gases, and gases containing fine particles.

At present, a large percentage of the waste gases produced in various factories are harmful and contaminate the ambient air to an impermissible extent, thus giving rise to a grave public problem. The present invention aims to remove harmful substances or fine grains from such harmful gases, incomplete combustion gases and other contaminated gases almost completely.

The first object of this invention is to provide a method for cleaning such a contaminated gas as is harmful or poisonous or contains fine particles which comprises equiping a contaminated-gas exhaust passage with cylindrical screens having meshes so sized as to allow liquid films to form on the screens; making liquids flow down on the screens, thereby utilizing the film forming property of the liquids to form uniformly thin liquid films over the screens; and bringing the contaminated gas into contact with the liquid films so as to cause the liquid films to absorb the contaminating substances of the gas.

The above stated method for cleaning contaminated gas will be illustrated more in detail hereunder: A barrel forming a midway portion of a flue for a combustion furnace is equipped with screens whose mesh size or sizes are suitable for alkaline and acid solutions and water to form films on the screens. After the liquid films are formed, a contaminated exhaust gas containing harmful or poisonous substances or fine particles, such as sulfurous acid gas, nitrous acid gas, carbon monoxide, or an organic noxious gas, is made to break through the liquid films arranged in succession, while the broken portions of the liquid films recover their continuity instantaneously to absorb the noxious substances contained in the harmful gas. The liquid films, while catching the harmful substances, flow down and are discharged, while the cleaned gas is exhausted.

The gists of the above-mentioned method are as stated below. A first important feature according to the invention is to furnish in the exhaust flue of a combustion furnace, at a midway portion thereof, cylindrical mesh screens capable of forming liquid films thereon and to make liquids to flow down on the screens with the intention of forming thin liquid films uniform in thickness over the screens by utilizing the film forming property of liquid. The liquid films are formed all over the screens so that a contaminated or harmful gas passing the flue never fails to come into contact with the liquid films and to have its noxious components absorbed into the films. A second feature is as mentioned below: Since a harmful gas generally contains a plurality of harmful substances, it is necessary for the liquid films to have different compositions so as to absorb the different noxious substances. In other words, the films used to absorb one or more harmful acidic substances included in the gas must be alkaline, whereas the films for absorbing the noxious alkaline component of the gas must be acidic. The conventional apparatus for removing harmful gases have employed such a process as first passing a harmful gas upward through a tower from the top of which an alkaline solution is sprayed so as to remove the acidic portion of the harmful gas and then leading the residual gas into another tower so as to remove the alkaline component from the gas by spraying an acid solution in the same manner as in the case of the alkaline spray, and further leading the remaining gas into another tower for washing the gas with water. Therefore, the conventional method requires an apparatus made up of separate units to carry out such operations as alkaline, acid and water washing, thus necessitating a high installation cost and a large site area, which make it very disadvantageous to set up an apparatus following the prior method. On the other hand, the method of the present invention enables a single unit to perform such washing operations as stated above all at once by the provision of cylindrical liquid films having different compositions, and the resultant simplified equipment is exceedingly advantageous with respect to the site area and installation cost as well as effective in actual operation. In practicing the present method, the sequence of arrangement of the liquids for cleaning may be changed according to the necessity.

The second object of the present invention is to provide an apparatus for cleaning contaminated gas in conformity with the method of the first object.

In the apparatus, an exhaust passage for a contaminated gas is furnished, in the middle, with a multiplicity of circularly or polygonal cylindrical mesh screens capable of forming liquid films, and while liquids are made to flow down on the screens, the contaminated gas is passed through the liquid-filmed screens at substantially right angles to the liquid film surfaces so that the gas is cleaned while passing through the screens without meeting with much resistance. The screens are divided into groups by baffles located between the screens and provided with sufficient spaces for the gas to pass therethrough. Each of the screen groups is covered with the liquid films of one and the same composition. By thus separating the liquid film layers by means of the baffles and bringing the contaminated gas into contact with the liquid films, it is possible to carry out such operations as alkaline treatment, acid treatment and water washing inside a single treating tower so as to remove the noxious substances from the contaminated gas.

The present invention will be more fully understood from the following detailed description taken in connection with the accompanying drawings, in which:

FIG. 1 is a front view in vertical section of the principal parts of a cylindrical harmful-gas cleaning apparatus which embodies the principle of the present invention and is applied to a flue for a combustion furnace;

FIG. 2 is a plane view in horizontal section taken on the line I—I in FIG. 1 showing the distributor included in the exemplary apparatus;

FIG. 3 is a plane view in horizontal section taken on the line II—II in FIG. 1 showing flowing-down liquid layers;

FIG. 4 is a plane view in horizontal section taken on the line III—III in FIG. 1 showing the portion of the apparatus which receives the liquids having flowed down;

FIG. 5 is an oblique view of the case of the apparatus which is partly broken away to show the interior arrangement.

Figure 6:
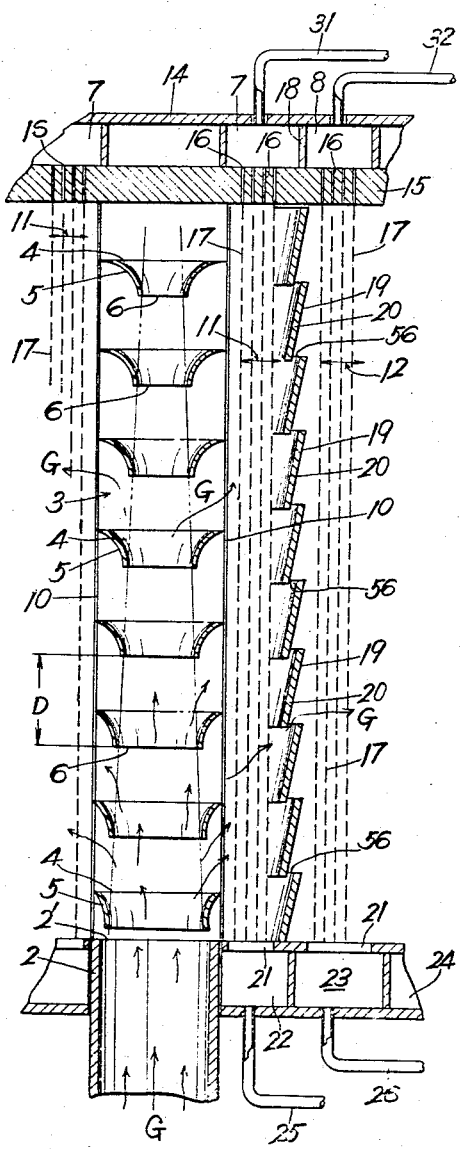
FIG. 6 is a view in vertical section of a part of the cleaning apparatus illustrating how the contaminated or harmful gas is dispersed.

A cylindrical case 1 is equipped, at its bottom center, with a noxious-gas inlet 2' connected to a gas passage 2 and, at the top center, with an exhaust pipe 48. A harmful gas "G" is passed through the inlet 2' into the cylindrical case 1 at an appropriate pressure. In the central space inside the case 1, a number of dispersers 4 are arranged at regular intervals in the longitudinal direction so as to set up a gas dispersion passage 3. Guided by the dispersers 4, the gas is dispersed in radially outward direction in the cylindrical case 1. As shown in FIGS. 1 and 5, each of the dispersers 4 is in the form of a ring whose wall 5 is so tapered as to define an opening 6 which has a larger diameter at the upper end than at the lower. The arrangement of the dispersers 4 will be well understood by reference to FIG. 6. The dispersers 4 are different from one another in wall and opening formation in such a manner that the wall 5 of each disperser has a large gradient in respect to the center line than has the wall 5 of the one step lower disperser and accordingly the opening 6 of the former disperser has a smaller diameter at its lower end than has the opening 6 of the latter so that the former disperser resembles the flaring portion of a trumpet much more than the latter does. Thus, the plane containing the lower or inner edge of each of the openings 6 defined by the dispersers 4 arranged at regular intervals "D" in the vertical direction forms virtually a long truncated cone having a larger diameter at its bottom than at the top. The dispersers spaced at the intervals "D" are each fixed, along the outer edge, by a number of supporting bars 10, which in turn are fixed, at their respective tops, to the lower surface of a distributing chamber 14 and, at the bottoms, in the vicinity of the gas inlet 2'.

Just above the gas dispersion passage 3, a cylindrical distribution chamber 14 comprising three concentrically arranged liquid chambers 7, 8, and 9 is fastened to the inner wall of the cylindrical case 1. Concentric slits 16 are made in the bottom plate 15 of the distribution chamber 14 so as to be connected with the liquid chambers 7, 8 and 9. As seen in FIG. 2, the slits 16 made in the bottom plate 15 are arranged with unslitted sections 57 along the same number of concentric circles as that of cylindrical mesh screens 17 suspended firmly under the slits 16. Under the bottom plate 15 of the liquid chambers, just where walls 18 define the liquid chambers baffles 20 are arranged each being formed by a plurality of superimposed rings whose top and bottom diameters are different from each other so as to provide between the rings annular spaces 56 for gas to pass therethrough. The lower edge of each baffle is partly connected with the upper edge of the baffle ring just below. The screens 17 are separated by the baffle 20 so that the alkaline-solution, acid-solution and water film layers 11, 12 and 13 respectively formed thereon are independent of one another.

The screens on which the liquid film layers 11, 12 and 13 are formed may vary in mesh size according to the nature of the noxious gas to be cleaned. However, the mesh size must be sufficiently large for any of the liquids to form films on the screens. Besides, the number of the screen sheets may be changed. Any adjacent screens must be spaced so that the liquid films formed on the screens may not come in touch with each other when gas passes through the films.

As seen in FIG. 1 and 6, alkaline-solution, acid-solution and water recovery channels 22, 23 and 24 respectively are formed independently of one another by walls 58 so as to receive the respective liquids through flowdown ports 21. The liquids thus received are discharged from the channels 22, 23 and 24 through the respective discharge ports 35 and pipes 25, 26 and 27 and enter tanks 36, 37 and 38 respectively as seen in FIG. 1.

In these tanks, the solids contained in the discharged liquids are precipitated, and then the remaining liquids are filtered by filters 50, 51 and 52 and sucked up into pumps 28, 29 and 30 through pipes 39, 40 and 41. The liquids coming out of the pumps are returned to the liquid chambers 7, 8 and 9 through return pipes 31, 32 and 33, which are equipped, in the middle, with cocks 42, 43 and 44 for replenishment of the liquids, and the pipes 32 and 33 are furnished with traps 45, and 46 respectively for measurement of the alkalinity and acidity of the corresponding circulated liquids.

Hereunder will be stated how harmful gas is treated in the apparatus embodying the present invention.

As seen in FIGS. 1 and 6, the harmful gas "G" having ascended through the flue at a pressure passes through the inlet 2' and is guided through the spaces "D" between the dispersers 4 setting up the gas dispersion passage 3 in the center of the cylindrical case 1, so as to be dispersed uniformly over the inner surfaces of the cylindrical screens 17. Since the cylindrical screens 17 are perfectly filmed, all over, with the liquids flowing down through the slits 16 made in the bottom place 15 of the liquid chambers 7, 8 and 9, such a harmful gas as sulfurous acid gas, nitrous acid gas or carbon monoxide and fine particles such as dirts and dust guided on to the screens come into complete contact with the liquid films. The first liquid film catches the solids and some of the acid component of the harmful gas "G". The gas passing through the screen is disturbed when breaking the liquid film so that the gas stream turns into a turbulent flow, and when the gas flow reaches the surface of the second liquid film, the gas is in a better dispersed state.

The remaining acid constituent of the gas is again partly absorbed into the second alkaline solution film. The gas left unabsorbed is further dispersed while passing the screen meshes and gets to the third alkaline solution film, where a proportion of the residual acid component of the gas is absorbed just as into the first and second alkaline solution films. Thus, by forming several alkaline solution films according to the composition of the harmful gas, the area of contact between harfmul gas and solution film can be made exceedingly large within a short distance of gas passage and the gas can be brought into complete contact with the alkaline solution. The gas having passed the alkaline-solution film layer 11 consisting of the alkaline solution films formed on the screens 17 is deprived by the baffle 20, which are provided for intercepting the alkaline solution drops carried by said gas and the latter passes through the spaces 56 between the rings of the baffle 20 on to the surface of the first acid solution film layer 12. In the same manner as in the case of the preceding alkaline solution films, the alkaline component of the harfmul gas is removed by the acid solution films. The gas having passed the acid-solution film layer 12 is deprived by the next baffle 20 from the acid solution drops accompanying said gas and passed through the separations 56 between the rings of this baffle 20 on to the water film layer 13. Finally, the layer 13 cleans off the acids and salts contained in the gas in the same way as do the alkaline-solution and acid-solution film layers. Thus, although the liquid films formed on the screens 17 are broken in succession by the pressure and passing of the gas, the flowing-down liquids, which are high in gas absorbing capacity, keep on forming into continuous films in place of the broken films instantaneously after the film rupture, so that the liquid films can absorb the noxious substances contained in the gas always efficiently.

The outermost baffle 20 remove the water drops mixed with the gas having passed the water film layer 13 from the gas, which then passes through the spaces 56 between the rings of the outermost baffle and, after being deodorized, rises in the space 53 between the series of the outermost baffle rings and the cylindrical case 1 along the inner wall of the case and passes through a multiplicity of holes 54 surrounding the distribution chamber 14 into an exhaust chamber 55. Then the gas is discharged through an exhaust pipe 48 into the open air. A damper 49 is installed inside the exhaust pipe 48, which is equipped also with a fan 47 for adjustment of the rate of the gas flow.

In this exemplary apparatus, it is also possible to change of the order of alkaline, acidic and water washing operations according to the necessity. Besides, only one or two of the three liquids may be used as the occasion demands.

Generally, liquid absorbs gas in such a manner that the rate of absorption is markedly high for an instant just after both have come in contact, but thereafter becomes lower and lower rapidly. In other words, gas, when left in contact with the surface of motionless liquid, is absorbed swiftly into liquid at first; however the rate of absorption is lowered rapidly thereafter. Therefore, in order to keep the rate of absorption high, the surface of liquid must always be renewed. The present apparatus meets such a requirement; namely, the liquids flowing down on the screens always have fresh and clean surfaces facing the gas to be cleaned. In addition, by making the gas pass through the liquid-filmed screens, the liquid films are so agitated as to reveal fresher surfaces.

More particularly, in the present apparatus, the gas to be cleaned is directed outward at substantially right angles with the surfaces of the liquid films, which are mutually spaced radially at regular intervals; therefore, the velocity of the gas flow through the liquid films is lowered in proportion to the distance measured radially from the center line of the cylindrical case. This fact is very significant as a favorable condition for the gas and liquids to come into complete contact: When a gas enters the harmful-gas cleaning apparatus at a flow velocity and the flow rate by quantity (the static pressure multiplied by the flow velocity) is excessively large with regard to the surfaces of the liquid films formed in the apparatus, the liquid films are unstable all over the screens. In an extreme case where the gas flow rate by quantity predominates over the liquid-film forming capacity, the liquid film cannot be formed with the result that the gas and liquids may not come in intimate contact. This drawback is overcome in the present apparatus.

Since in this apparatus a multiplicity of liquid films are formed concentrically as already mentioned, the more distant a liquid film is positioned from the center line of the cylindrical case, the larger is the area of the film, so that for a gas quantity entering the apparatus per unit time, the period of time during which the gas is in contact with any of the liquid films varies according to the position of the liquid film. It is a matter of course that as the gas proceeds outward, the contact area increases and thus the flow rate decreases. Even if the quantity of the harmful gas introduced per unit time is exceedingly large as compared with the contact area of the innermost liquid film, so that the liquid film cannot be maintained, the second liquid film outside the innermost film has a larger contact area than has the first film and therefore cannot be so unstable as the first liquid film. Again, even if the quantity of gas having passed through the first liquid film without being absorbed into the film is so large that part of the second liquid film is left broken and allows some of the harmful gas to pass without touching the liquid, the third liquid film is larger in contact area than the second and therefore may be perfectly formed all over the screen, thus being capable of absorbing the gas satisfactorily. Where such a state as stated above is established, the amount of the gas passing through the liquid film balances with the contact area of the liquid film. In order for the liquids to absorb the harmful gas more thoroughly, the gas flow is made still slower and the time of contact with the liquids is further elongated by passing the gas through the outer liquid films. Thus, whether the flow rate of the gas entering the present apparatus is large or small or variable, the gas may come into complete contact with some of the liquid films provided in the apparatus.

As apparent from the foregoing description, the gas cleaning apparatus embodying the present invention is very useful when applied to the removal of industrial waste gases which are so noxious as to give rise to a great public problem, for example, sulfurous acid gas, and also applicable to the removal of organic stinking gases. While it is desirable, in case of removing an organic bad-smelling gas, to provide the cleaning apparatus with alkaline-solution, acid-solution and water film layers, such an inorganic waste gas as sulfurous acid gas or nitrous acid gas requires only two layers, namely, alkaline-solution and water film layers. Besides, for cleaning a gas contaminated by fine particles, powder or dust, only the water film layer is necessary. In addition, the sequence of arrangement of the liquid film layers may be changed according to the kind of the contaminated gas to be cleaned. Thus, the present apparatus can be used conveniently for cleaning a wide variety of contaminated gases.

What is claimed is:

1. A method of cleaning contaminated gas comprising the steps of feeding a stream of contaminated gas under pressure in a first direction; dispersing that stream of gas into a plurality of streams passing in a second direction transverse to the first direction; passing said plurality of streams in said second direction successively through a plurality of moving liquid films having different compositions spaced from each other and extending and moving in a third direction transverse to said second direction so that contaminating material contained in the gas is removed therefrom by the liquids forming said films and a clean gas is obtained; and discharging the cleaned gas and the liquids containing the contaminations in different directions.

2. A method as defined in claim 1, wherein at least three liquid films are provided, one being formed by an alkaline solution, one by an acidic solution, and one by water.

3. A method as defined in claim 1, wherein said plurality of films are of substantially cylindrical form and arranged substantially coaxially with the stream of gas passing in said first direction, so that the speed of the gas is reduced during the passage of the gas from the innermost to the outermost film while the area of contact between film and gas is increased.

4. A method as defined in claim 1, and including the steps of intercepting any droplets taken along by the gas while passing through one liquid film before the gas reaches the next liquid film.

5. A method as defined in claim 1, and including the steps of discharging the liquids of the various films containing the contaminations separately from each other, filtering solid particles out of the liquids, mixing the filtered liquids with fresh liquids, and recirculating the mixed liquids to respectively form said plurality of films.

6. An apparatus for cleaning contaminated gas comprising, in combination, a substantially cylindrical casing having a substantially vertical axis and having a bottom end and a top end; gas inlet means extending substantially coaxially with said axis for feeding a stream of contaminated gas under pressure into said casing; disperser means in said passage means in said casing for dispersing and deflecting said stream of gas into a plurality of gas streams passing through said casing in a substantially horizontal direction; a plurality of substantially upright screens extending spaced from each other through said casing and substantially coaxially with said axis; means for feeding liquids to the upper edges of said screens so that the liquids flowing downwardly on the screens will form thin liquid films thereon, whereby the contaminations contained in the contaminated gas will be removed as the latter passes through the screens and the liquid films thereon; liquid discharge means at the bottom end of the casing; and exhaust means communicating with said casing for discharging the cleaned gas from the latter.

7. An apparatus as defined in claim 6, and including baffle means arranged between said plurality of screens and also between the outer most screen and said casing and constructed to let the gas pass therethrough while intercepting droplets taken along by the gas while passing through the liquid films.

8. An apparatus as defined in claim 7, wherein each of the baffle means comprises a plurality of substantially frusto-conical rings arranged coaxially with said axis, one above the other, with the small diameter end of one ring adjacent the large diameter end of the next ring so as to form between adjacent rings annular passages for the gas.

9. An apparatus as defined in claim 6, wherein said means for feeding liquids to the upper edges of said screens comprise a plurality of upper annular chambers, one for each screen, arranged above the latter in said casing and each having a bottom wall formed with at least one annular slot aligned with the respective upper screen edge.

10. An apparatus as defined in claim 9, wherein said liquid discharge means comprise a plurality of lower annular chambers, one for each screen, arranged substantially coaxially with said axis below said screens and each having an upper open end aligned with the respective screen.

11. An apparatus as defined in claim 10, and including a plurality of pipes respectively communicating at one end thereof with a respective one of said lower annular chambers and at the other end thereof with the corresponding upper annular chamber and filter means and pump means in said pipes for filtering the liquid passing therethrough and for recirculating the liquid from said lower to said upper chamber.

12. An apparatus as defined in claim 6, wherein said exhaust means comprise an exhaust pipe communicating with said upper end of said casing substantially coaxial therewith and including a fan and a damper in said exhaust pipe for regulating the flow of gas therethrough.

References Cited

UNITED STATES PATENTS

| 970,654 | 9/1910 | Sepulchre | 55—89 |
| 1,897,725 | 2/1933 | Gaus et al. | 23—2 |
| 2,043,109 | 6/1936 | McKee et al. | 23—2 |
| 2,430,861 | 11/1947 | Carpenter et al. | 55—90 |
| 2,573,491 | 10/1951 | Richardson | 55—240 |
| 3,050,919 | 8/1962 | Tailor | 55—94 |
| 3,282,047 | 11/1966 | Wertheimer | 55—229 |
| 2,452,859 | 11/1948 | Moody | 55—260 |

FOREIGN PATENTS

| 883,577 | 11/1961 | Great Britain. |
| 62,804 | 8/1940 | Norway. |

REUBEN FRIEDMAN, *Primary Examiner.*

C. N. HART, *Assistant Examiner.*